(12) United States Patent
Hsien

(10) Patent No.: US 6,848,468 B1
(45) Date of Patent: Feb. 1, 2005

(54) DRAIN COVER ASSEMBLY

(75) Inventor: Tung-Min Hsien, Taichung Hsien (TW)

(73) Assignee: Saint Island International, Taiwan (CN)

(*) Notice: Subject to any disclaimer, the term of this patent is extended or adjusted under 35 U.S.C. 154(b) by 0 days.

(21) Appl. No.: 10/705,149

(22) Filed: Nov. 10, 2003

(51) Int. Cl.⁷ .............................. F16K 1/16; F16L 5/00
(52) U.S. Cl. ..................................... 137/362; 137/527.8
(58) Field of Search ............................. 137/362, 527.8, 137/527.6, 527

(56) References Cited

U.S. PATENT DOCUMENTS 6,319,397 B1 * 11/2001 Su et al. ...................... 210/163

* cited by examiner

Primary Examiner—Kevin Lee
(74) Attorney, Agent, or Firm—Gray Cary Ware & Freidenrich LLP

(57) ABSTRACT

A drain cover assembly includes a closure device operable so as to close and open a drain hole in a cover plate of a drain cover unit. The closure device includes a pivot arm having a mounting portion connected pivotally to the cover plate, a flow control portion extending from and disposed on a first side of the mounting portion and registered with the drain hole, and a weighted portion extending from and disposed on a second side of the mounting portion and having a weight sufficient to overcome the weight of the flow control portion so as to cause the pivot arm to pivot from an open position to a normal closed position. The pivot arm pivots to the open position when the flow control portion is subjected to an applied load through the drain hole that is sufficient to overcome the weight of the weighted portion.

6 Claims, 16 Drawing Sheets

DRAIN COVER ASSEMBLY

BACKGROUND OF THE INVENTION

1. Field of the Invention

The present invention relates to a drain cover assembly, more particularly to a drain cover assembly that includes a closure device for closing a drain hole in a cover plate of a drain cover unit.

2. Description of the Related Art

Referring to FIGS. 1 to 3, a conventional drain cover assembly 10 is shown to include a drain cover plate 11 that is formed with a plurality of drain holes 12, and a bottom plate 14 that is fastened to a bottom side of the cover plate 11 with the use of a fastener 13 so as to close the drain holes 12. In a normal state, by virtue of inherent resiliency of the bottom plate 14, the drain holes 12 are closed. However, when water, such as rainwater, fills the drain holes 12, the water applies a load on the bottom plate 14, which causes the latter to flex, thereby opening the drain holes 12 for draining purposes.

The following are some of the drawbacks of the aforesaid conventional drain cover assembly 10:

1. Closing and opening of the drain holes 12 is possible due to the resilient characteristics of the bottom plate 14. However, since the bottom plate 14 is likely to suffer from elastic fatigue after a period of use, the bottom plate 14 will eventually be unable to close the drain holes 12.

2. Since there is always a clearance present between the bottom plate 14 and the cover plate 1, insects cannot be prevented from passing through the drain holes 12 in the cover plate 11.

3. Dirt that accumulates between the bottom plate 14 and the cover plate 11 adjacent to the fastener 13 can affect adversely the closing effect of the bottom plate 14.

SUMMARY OF THE INVENTION

Therefore, the object of the present invention is to provide a drain cover assembly that can overcome the aforesaid drawbacks associated with the prior art.

According to the present invention, a drain cover assembly comprises a drain cover unit and a closure device. The drain cover unit includes a cover plate formed with a drain hole. The closure device is operable so as to close and open the drain hole, and includes a pivot arm having a mounting portion connected pivotally to the cover plate, a flow control portion extending from and disposed on a first side of the mounting portion and registered with the drain hole, and a weighted portion extending from and disposed on a second side of the mounting portion opposite to the first side. The weighted portion has a weight sufficient to overcome the weight of the flow control portion so as to cause the pivot arm to pivot from an open position to a normal closed position, where the flow control portion closes the drain hole. The pivot arm pivots from the normal closed position to the open position when the flow control portion is subjected to an applied load through the drain hole that is sufficient to overcome the weight of the weighted portion.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
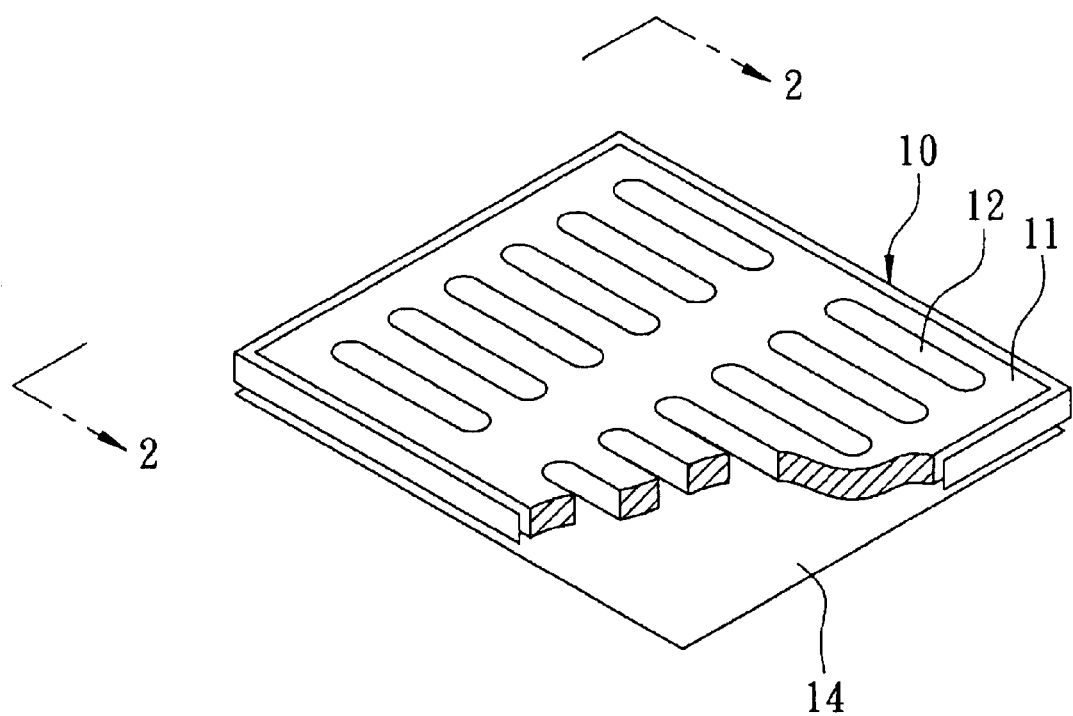
FIG. 1 is fragmentary perspective view of a conventional drain cover assembly.
Figure 2:
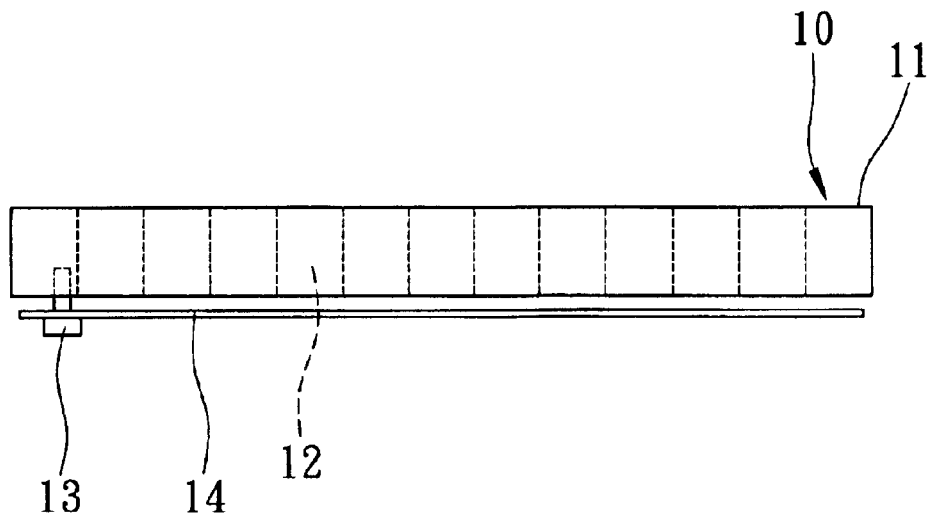
FIG. 2 is a schematic view to illustrate the conventional drain cover assembly in a normal closed state.
Figure 3:
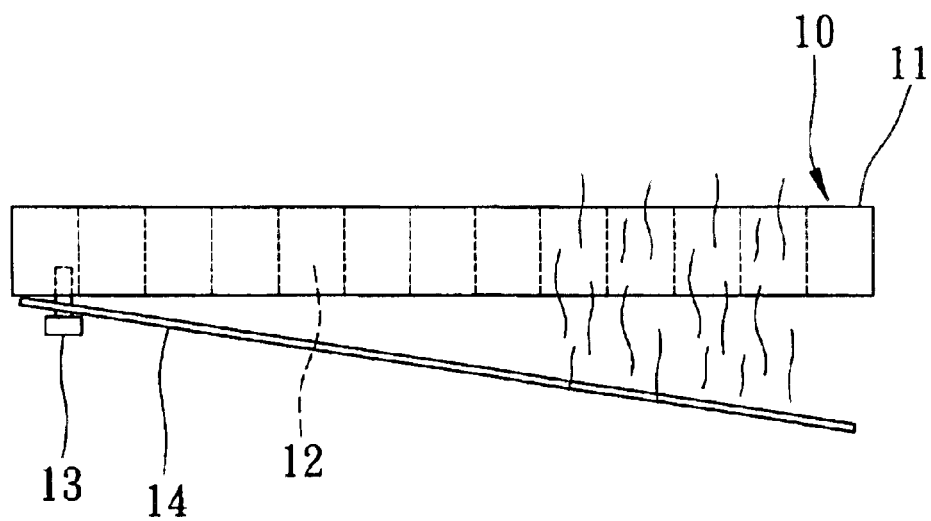
FIG. 3 is a schematic view to illustrate the conventional drain cover assembly in an open state for draining.

Before the present invention is described in greater detail with reference to the accompanying preferred embodiments, it should be noted herein that like elements are denoted by the same reference numerals throughout the disclosure.

Figure 4:
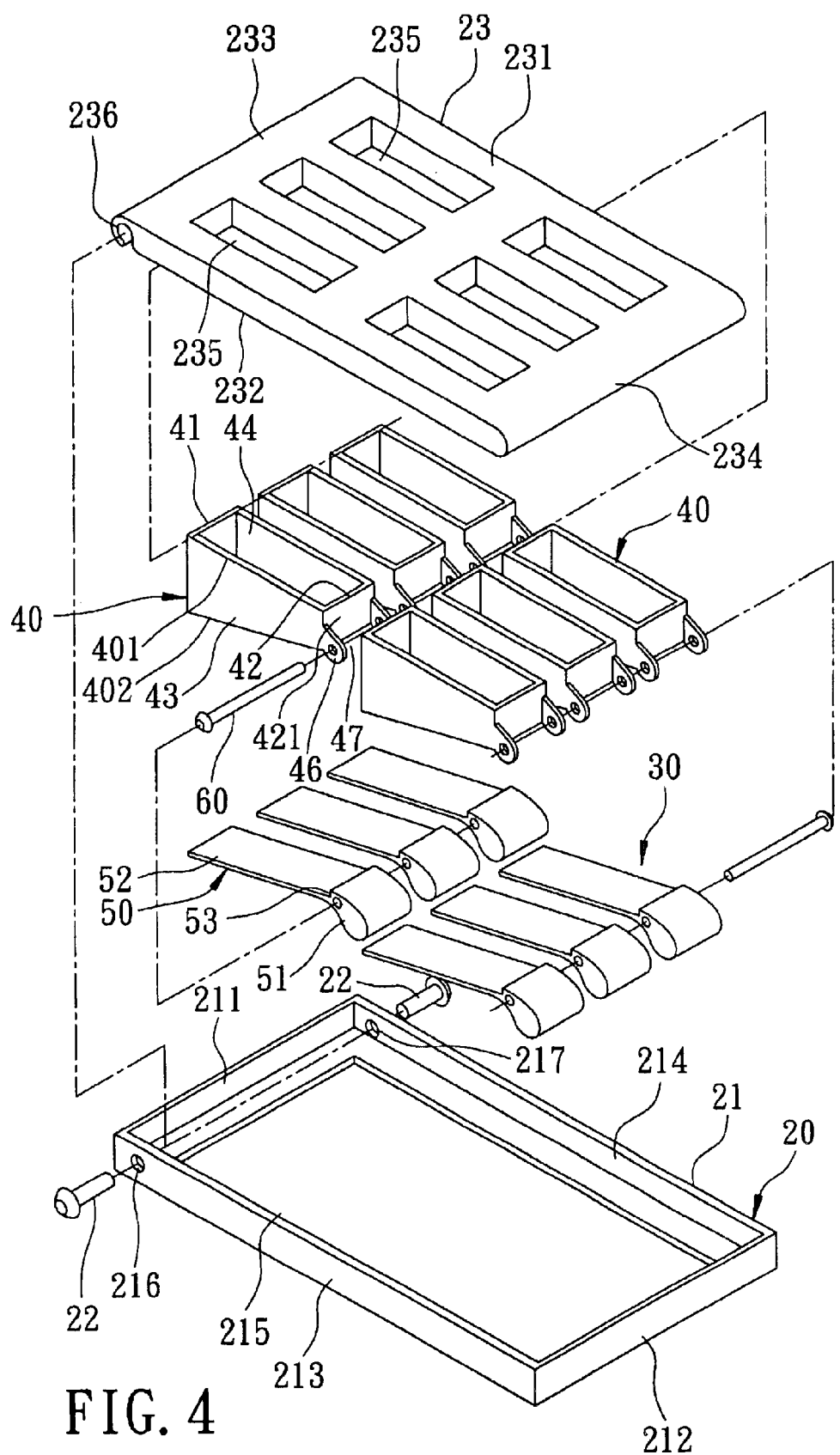
FIG. 4 is an exploded perspective view of the first preferred embodiment of a drain cover assembly according to the present invention.
Figure 6:
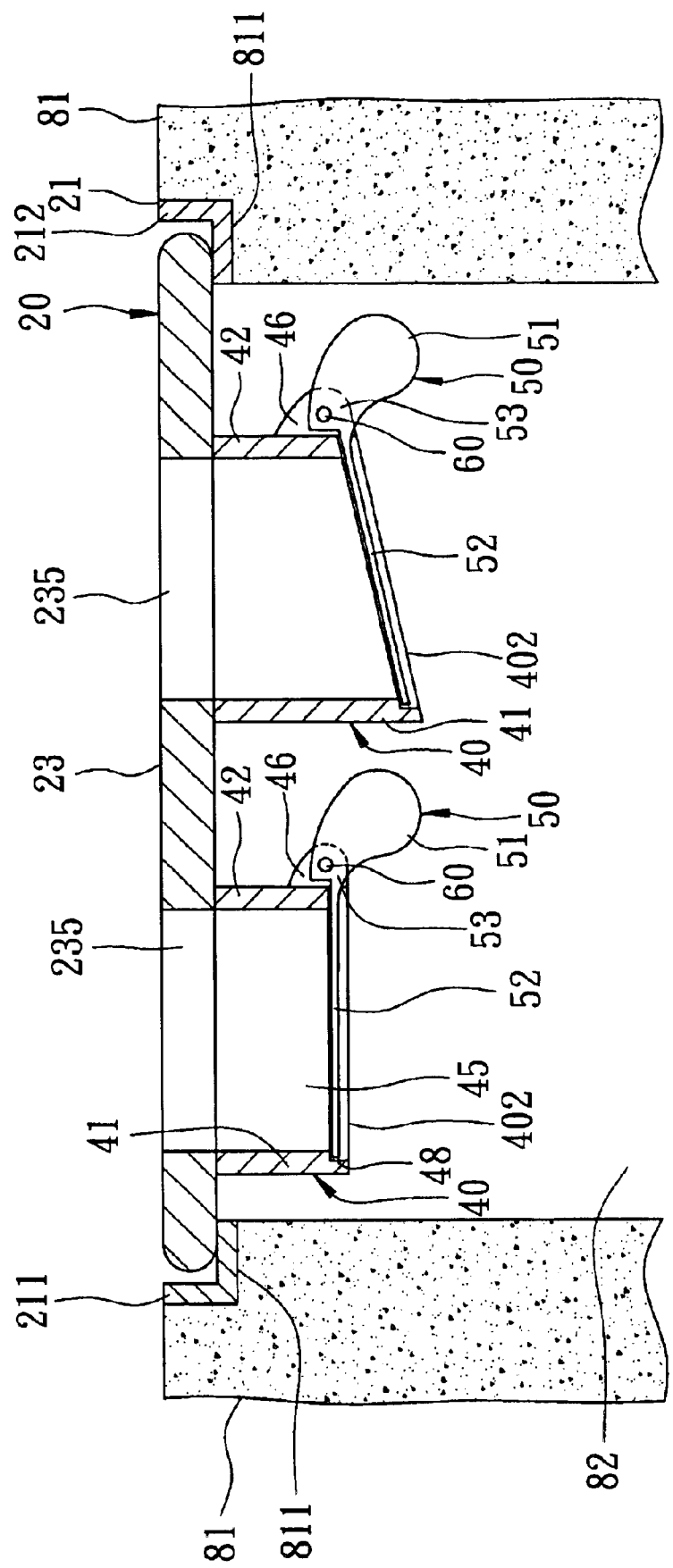
FIG. 6 is a sectional view to illustrate the closure devices of the first preferred embodiment in a normal closed state.

Referring to FIGS. 4 and 6, the first preferred embodiment of a drain cover assembly according to the present invention is shown to be mounted between two drainage walls 81 of a drainage structure 82. Each of the drainage walls 81 has a recessed top edge 811.

The drain cover assembly includes a drain cover unit 20 seated on the recessed top edges 811 of the drainage walls 81, and a closure device 30.

The drain cover unit 20 includes a cover plate 23, a hollow seat frame 21 for receiving the cover plate 23 therein, and a pivot pin unit 22 for retaining pivotally the cover plate 23 in the seat frame 21.

In this embodiment, the seat frame 21 includes opposite first and second angled plates 211, 212, and opposite third and fourth angled plates 213, 214 that interconnect the first and second angled plates 211, 212. The first, second, third and fourth angled plates 211, 212, 213, 214 cooperate to form a receiving space 215 for receiving the cover plate 23 therein. A pair of aligned pin holes 216, 217 are formed through one end of the third and fourth angled plates 213, 214, respectively.

In this embodiment, the pivot pin unit 22 includes a pair of pivot pins. In practice, it is possible to employ only one pivot pin to achieve the intended function.

Figure 13:
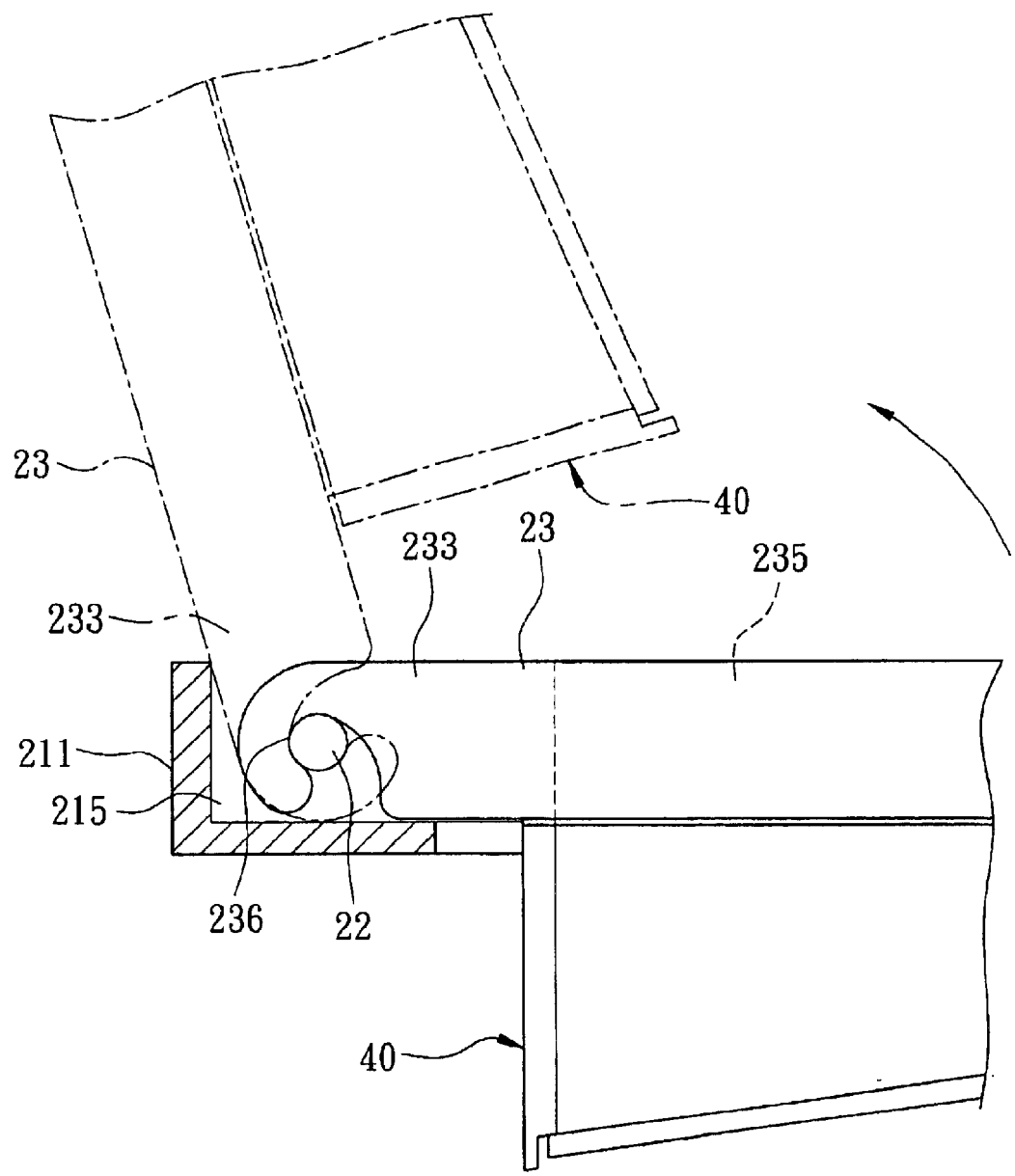
FIG. 13 is a fragmentary sectional view of a preferred embodiment, illustrating a cover plate of a drain cover unit in a lifted state.

As shown in FIGS. 4 and 13, the cover plate 23 has opposite top and bottom sides 231, 232, and opposite first and second end portions 233, 234. The cover plate 23 is formed with a plurality of drain holes 235 that extend from the top side 231 to the bottom side 232. The first end portion 233 is formed with a pin groove 236 that opens at the bottom side 232 of the cover plate 23 for engaging the pivot pin unit 22.

The pin groove 236 is designed for sleeve engagement with the pivot pin unit 22 such that when a lifting force is applied at the second end portion 234 of the cover plate 23, the cover plate 23 will pivot about the pivot pin unit 22 from a first position, where the cover plate 23 is disposed in the receiving space 215, to a second position, where the cover plate 23 forms a predetermined angle (preferably about 110 degrees) with the seat frame 21. When the cover plate 23 is at the second position, the cover plate 23 leans against the first angled plate 211 so that the cover plate 23 can be prevented from escaping undesirably from the pivot pin unit 22.

Moreover, by simply registering the pin groove 236 with the pivot pin unit 22, the cover plate 23 can be assembled and disassembled from the seat frame 21 with relative ease.

Figure 5:
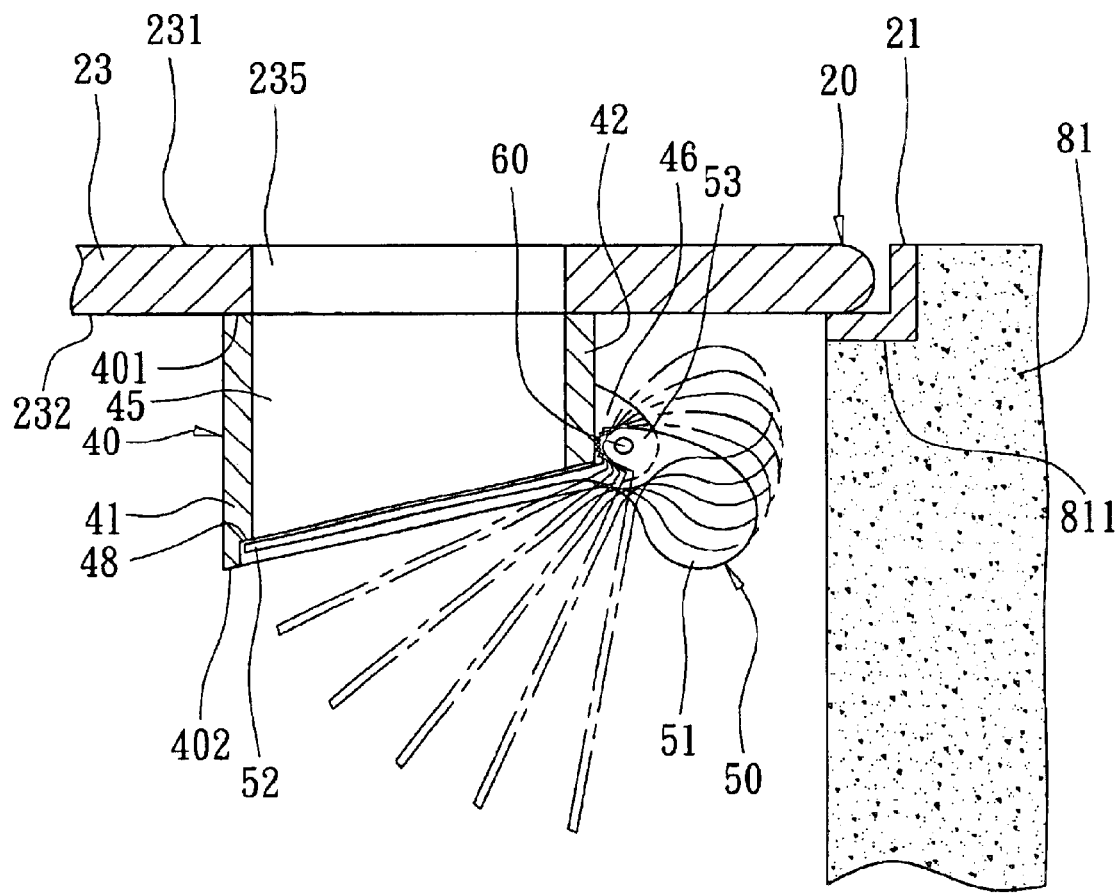
FIG. 5 is a fragmentary sectional view to illustrate pivoting movement of a pivot arm of a closure device of the first preferred embodiment.

Referring back to FIGS. 4 and 6, in this embodiment, the drain cover unit 20 further includes a plurality of pivot seats 40 mounted fixedly on the bottom side 232 of the cover plate 23. The pivot seats 40 correspond in number to the drain holes 235. Each pivot seat 40 is a hollow seat having opposite first and second walls 41, 42 and opposite third and fourth walls 43, 44 that interconnect the first and second walls 41, 42. The first, second, third and fourth walls 41, 42, 43, 44 confine a space 45 to be registered with a corresponding one of the drain holes 235. With further reference to FIG. 5, each pivot seat 40 has a first or top open end 401 that is fixed to the bottom side 232 of the cover plate 23, and a second or bottom open end 402 that is opposite to the first open end 401. Each pivot seat 40 further has a pair of pivot lugs 46 that extend from an outer wall surface 421 of the second wall 42.

It should be noted herein that the exact shapes of the drain holes 235 and the pivot seats 40 are not critical to the practice of the present invention, and should not be limited to the rectangular shapes of the disclosed embodiment.

The closure device 30 is operable so as to close and open the drain holes 235. In this embodiment, the closure device 30 includes a plurality of pivot arms 50 that also correspond in number to the drain holes 235. Each pivot arm 50 includes a mounting portion 53, a flow control portion 52, and a weighted portion 51. The mounting portion 53 extends into a space 47 confined by the pivot lugs 46 on a respective one of the pivot seats 40, and is connected pivotally to the pivot lugs 46 by a pivot axle 60. The flow control portion 52 extends from and is disposed on a first side of the mounting portion 53, and is registered with the space 45 in the respective one of the pivot seats 40. Accordingly, the flow control portion 52 is registered with a respective one of the drain holes 235 in the cover plate 23. The flow control portion 52 has a peripheral section that engages a periphery 48 of the second open end 402 of the respective pivot seat 40 when the pivot arm 50 is disposed at a normal closed position, where the flow control portion 52 closes the respective drain hole 235, as best shown in FIG. 6. The weighted portion 51 extends from and is disposed on a second side of the mounting portion 53 opposite to the first side. The weighted portion 51 has a weight sufficient to overcome the weight of the flow control portion 52 so as to cause the pivot arm 50 to pivot from an open position (see FIG. 7) to the normal closed position (see FIG. 6). The pivot arm 50 pivots from the normal closed position to the open position when the flow control portion 52 is subjected to an applied load through the drain hole 235, such as when water flows through the respective drain hole 235 and into the respective pivot seat 40, that is sufficient to overcome the weight of the weighted portion 51.

Figure 7:
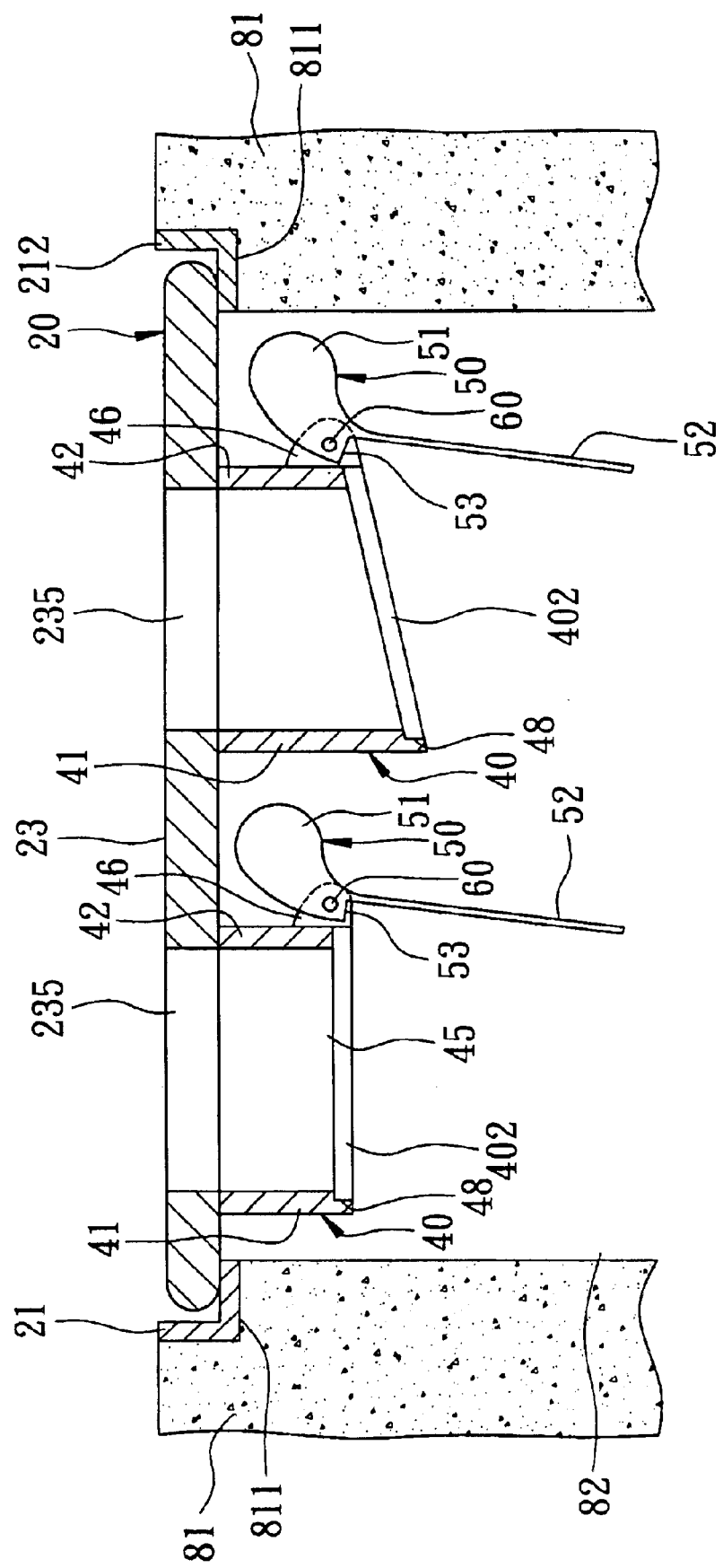
FIG. 7 is a sectional view to illustrate the closure devices of the first preferred embodiment in an open state.
Figure 8:
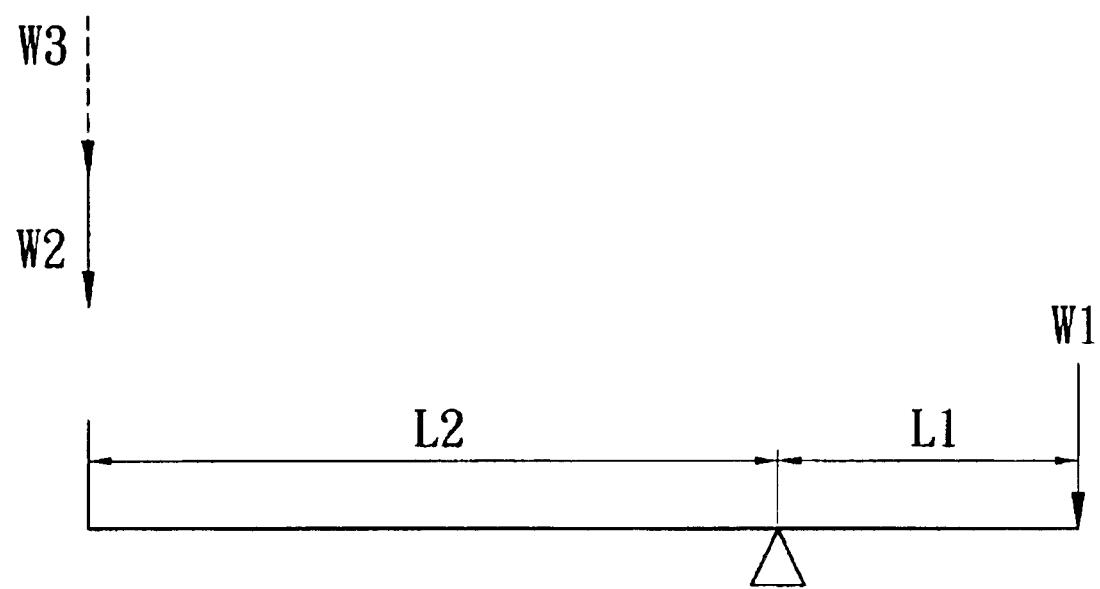
FIG. 8 is a force diagram to illustrate force moment relationships in the first preferred embodiment of this invention.

As shown in FIGS. 6, 7 and 8, the pivot axle 60 acts as a fulcrum point of the pivot arm 50. A weight center of the weighted portion 51 forms a first distance (L1) with the pivot axle 60, whereas a weight center of the flow control portion 52 forms a second distance (L2) with the pivot axle 60. In view of the weight (W1) of the weighted portion 51, the weighted portion 51 applies a first force moment (M1) equal to the product of the first distance (L1) and the weight (W1) with respect to the pivot axle 60, which is the pivot junction of the mounting portion 51 and the respective pivot seat 40. On the other hand, in view of the weight (W2) of the flow control portion 52, the flow control portion 52 applies a second force moment (M2) equal to the product of the second distance (L2) and the weight (W2) with respect to the pivot axle 60. Under normal conditions, since the first force moment (M1) is designed to be larger than the second force moment (M2), the pivot arm 50 pivots such that the peripheral section of the flow control portion 52 engages the periphery 48 of the second open end 402 of the respective pivot seat 40, thereby enabling the pivot arm 50 to close the respective drain hole 235, as best shown in FIG. 6. Therefore, when the pivot arm 50 is disposed at the normal closed position, debris, fallen leaves, etc. can be prevented from reaching the drainage structure 82 such that blocking of the latter can be minimized, and the foul smell of drain water through the drainage structure 82 can be isolated by the drain cover assembly of this invention.

When water, such as rainwater, flows through the drain holes 235 and enters the pivot seats 40, the accumulated water applies a load (W3) on the flow control portions 52 of the pivot arms 50. At this time, when the effective force moment attributed to the weight (w2) of the flow control portion 52 and the load (W3) exceeds the first force moment (M1), the pivot arm 50 pivots to the open position for draining the water in the respective pivot seat 40 to the drainage structure 82, as best shown in FIG. 7.

Eventually, when the load (W3) becomes insufficient to overcome the weight (W1) of the weighted portion 51, the pivot arm 50 will pivot back to the normal closed position such that the peripheral section of the flow control portion 52 once again engages the periphery 48 of the second open end 402 of the pivot seat 40, as shown in FIG. 6.

Furthermore, in view of the engagement between the peripheral section of the flow control portion 52 and the periphery 48 of the second open end 402 of the pivot seat 40, insects can be prevented from passing through the drain cover assembly of this invention when the pivot arms 50 are disposed at the normal closed position.

It should be noted herein that the first, second, third and fourth walls 41, 42, 43, 44 of the pivot seat 40 can have equal heights such that the second open end 402 of the pivot seat 40 is parallel to the ground. Alternatively, the first and second walls 41, 42 of the pivot seat 40 can have different heights such that the second open end 402 of the pivot seat 40 is inclined relative to the ground. When the second open end 402 of the pivot seat 40 is inclined, closing of the respective drain hole 235 can be made possible by the corresponding pivot arm 50 through a smaller pivoting angle.

Figure 9:
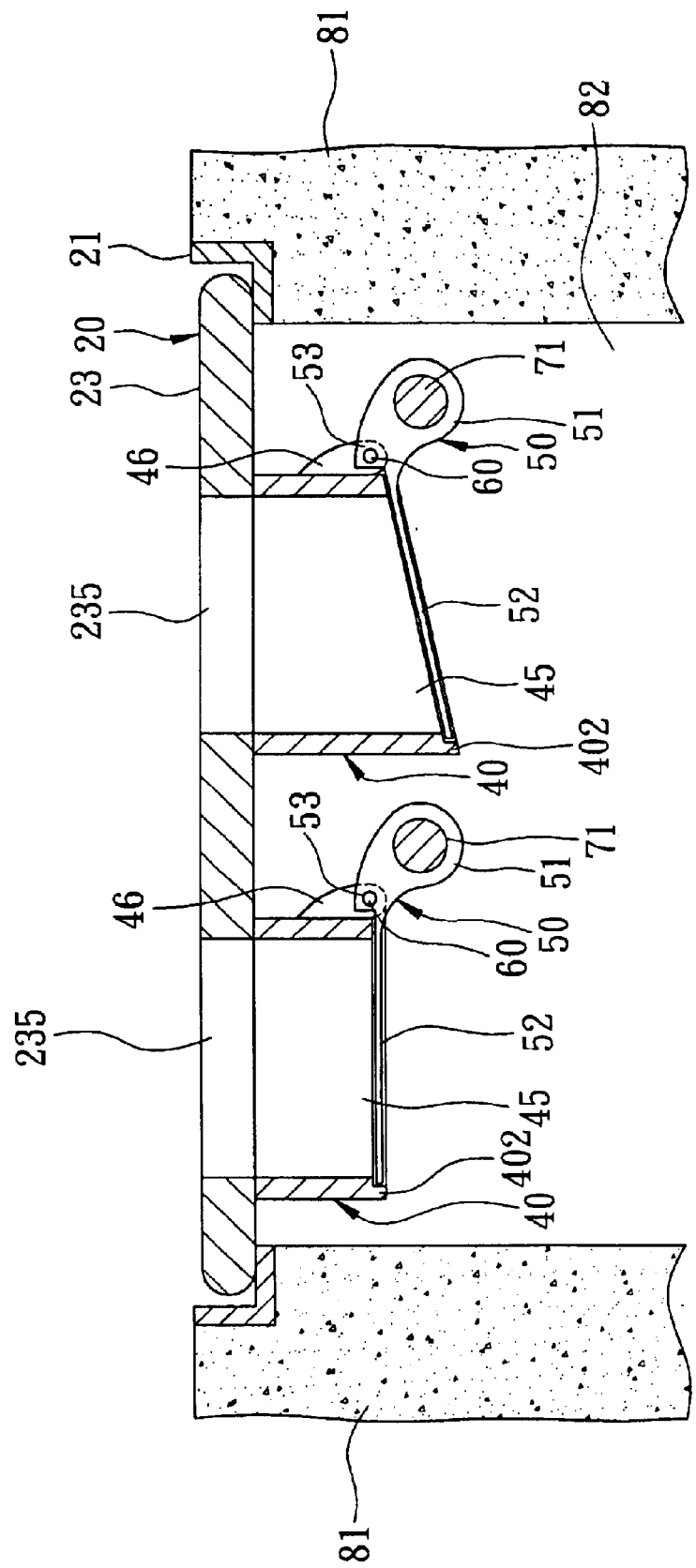
FIG. 9 is a sectional view of the second preferred embodiment of a drain cover assembly according to this invention.

FIG. 9 illustrates the second preferred embodiment of a drain cover assembly according to this invention, which differs from the first preferred embodiment in the design of the weighted portion 51 of each pivot arm 50. Unlike the previous embodiment, the weighted portion 51 applies an adjustable moment of force with respect to the pivot junction of the mounting portion 53 and the pivot seat 40 to ensure that the flow control portion 52 can effectively close the second open end 402 of the pivot seat 40 in spite of errors in the manufacture of the pivot arms 50 and the pivot seats 40. In this embodiment, the weighted portion 51 has a weight-increasing block 71 mounted thereto. The weight of the weight-increasing block 71 is selected so as to compensate for the presence of the manufacturing errors.

Figure 10:
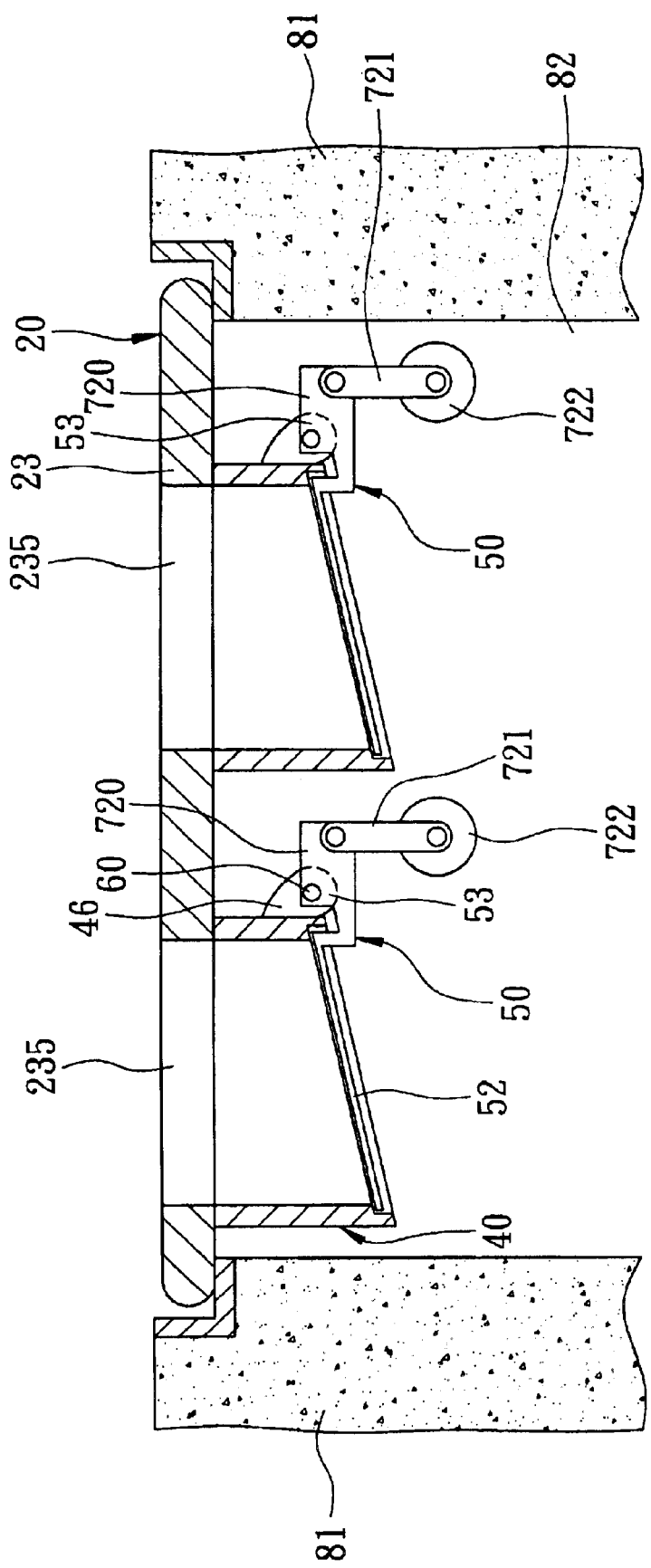
FIG. 10 is a sectional view of the third preferred embodiment of a drain cover assembly according to this invention.
Figure 11:
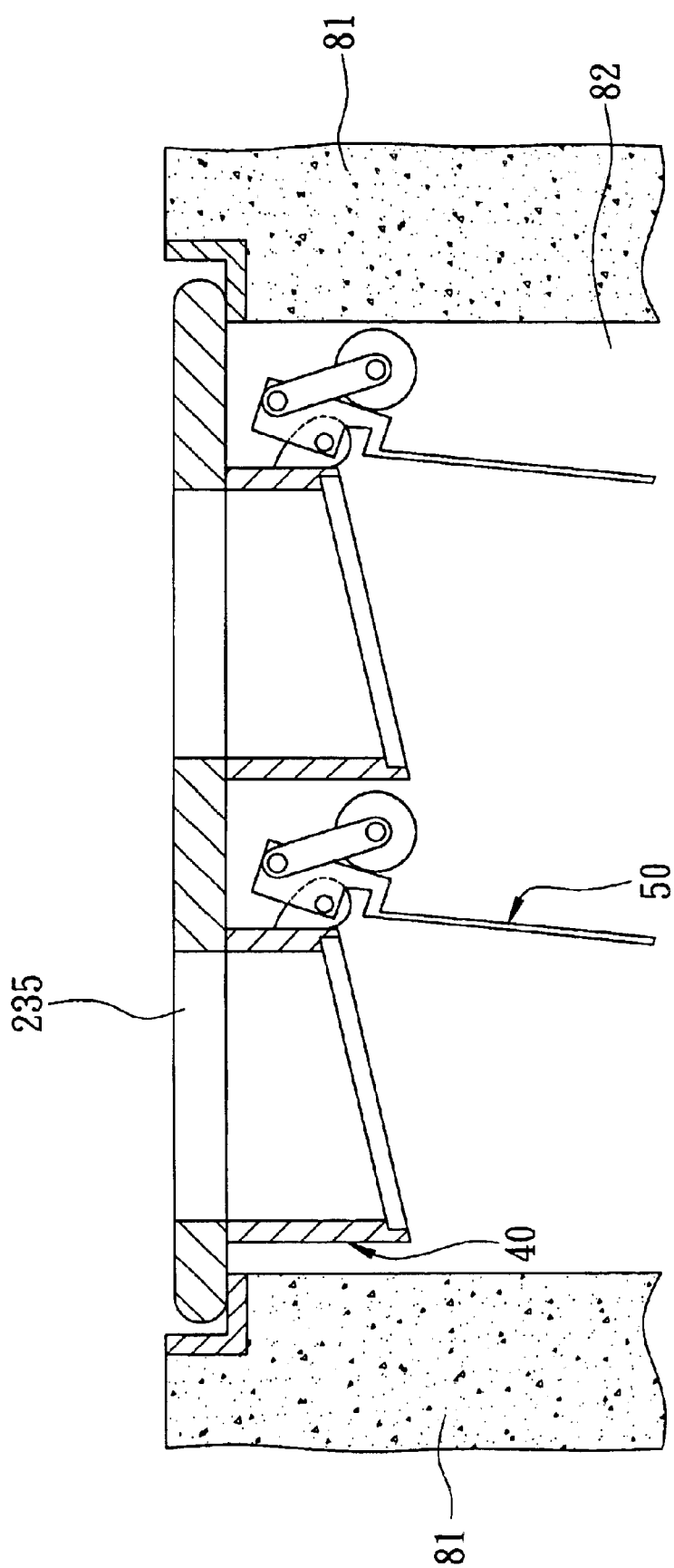
FIG. 11 is another sectional view of the third preferred embodiment, illustrating closure devices of the same in an open state.

FIGS. 10 and 11 illustrate the third preferred embodiment of a drain cover assembly according to this invention. Like the embodiment of FIG. 9, the weighted portion also applies an adjustable moment of force with respect to the pivot junction of the mounting portion 53 and the pivot seat 40. However, in this embodiment, the weighted portion includes an extension section 720, a link 721, and a weight-increasing member 722. The extension section 720 extends from the mounting portion 53. The link 721 has a first end pivoted to the extension section 720, and an opposite second end. The weight-increasing member 722 is in the form of a roller that is mounted on the second end of the link 721. By pivoting the link 721 toward and away from the flow control portion 52 to vary the distance between the weight-increasing member 722 and the pivot axle 60, the moment of force with respect to the pivot axle 60 and attributed to the weighted portion of the pivot arm 50 can be adjusted accordingly.

Figure 12:
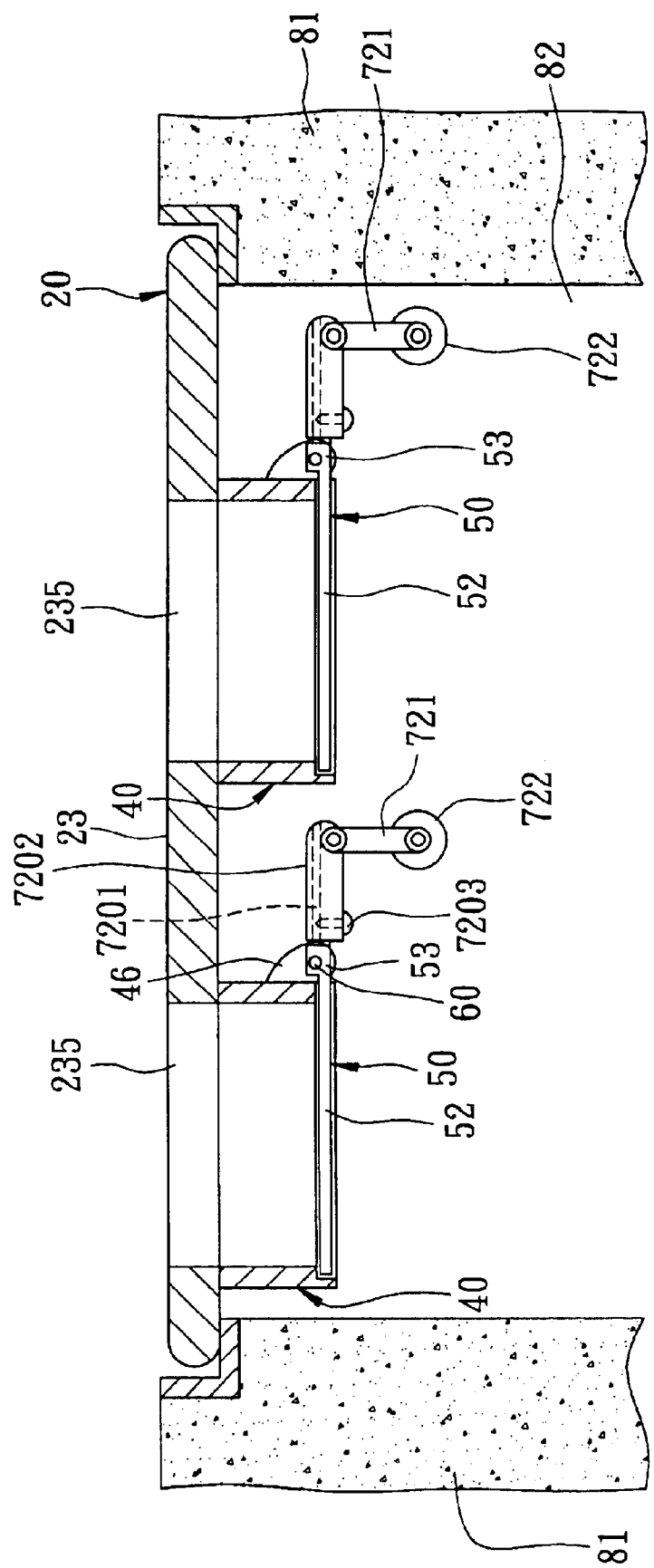
FIG. 12 is a sectional view of the fourth preferred embodiment of a drain cover assembly according to this invention.

FIG. 12 illustrates the fourth preferred embodiment of a drain cover assembly according to this invention, which is a modification of the third preferred embodiment. This embodiment differs from the third preferred embodiment in that the extension section of the weighted portion includes an inner block 7201 extending from the mounting portion 53, an outer block 7202 mounted slidably on the inner block 7201 and having the first end of the link 722 mounted pivotally thereon, and a fastener 7203 for retaining the outer block 7202 at a desired position on the inner block 7201. The construction as such results in a variable length for the extension section to permit further adjustment in the distance between the weight-increasing member 722 and the pivot axle 60.

In practice, the dispositions of the inner and outer blocks 7201, 7202 of the extension section may be reversed. Particularly, the outer block may be configured to extend from the mounting portion 53. In this case, the inner block is slidable relative to the outer block and is connected pivotally to the link 721.

Figure 14:
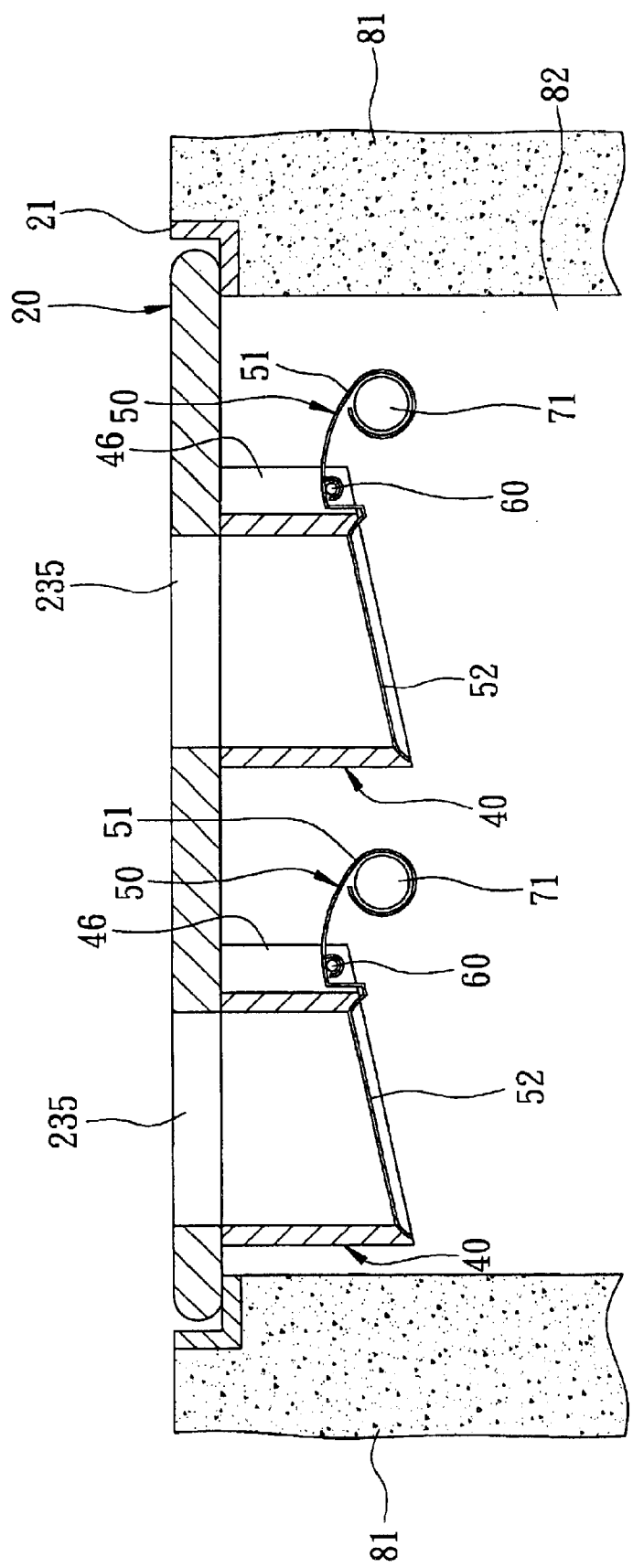
FIG. 14 is a sectional view of the fifth preferred embodiment of a drain cover assembly according to this invention.

FIG. 14 illustrates the fifth preferred embodiment of a drain cover assembly according to this invention, which is a modification of the embodiment shown in FIG. 9. Unlike the embodiment of FIG. 9, the pivot arm 50 is an integrally formed plate in this embodiment.

Figure 15:
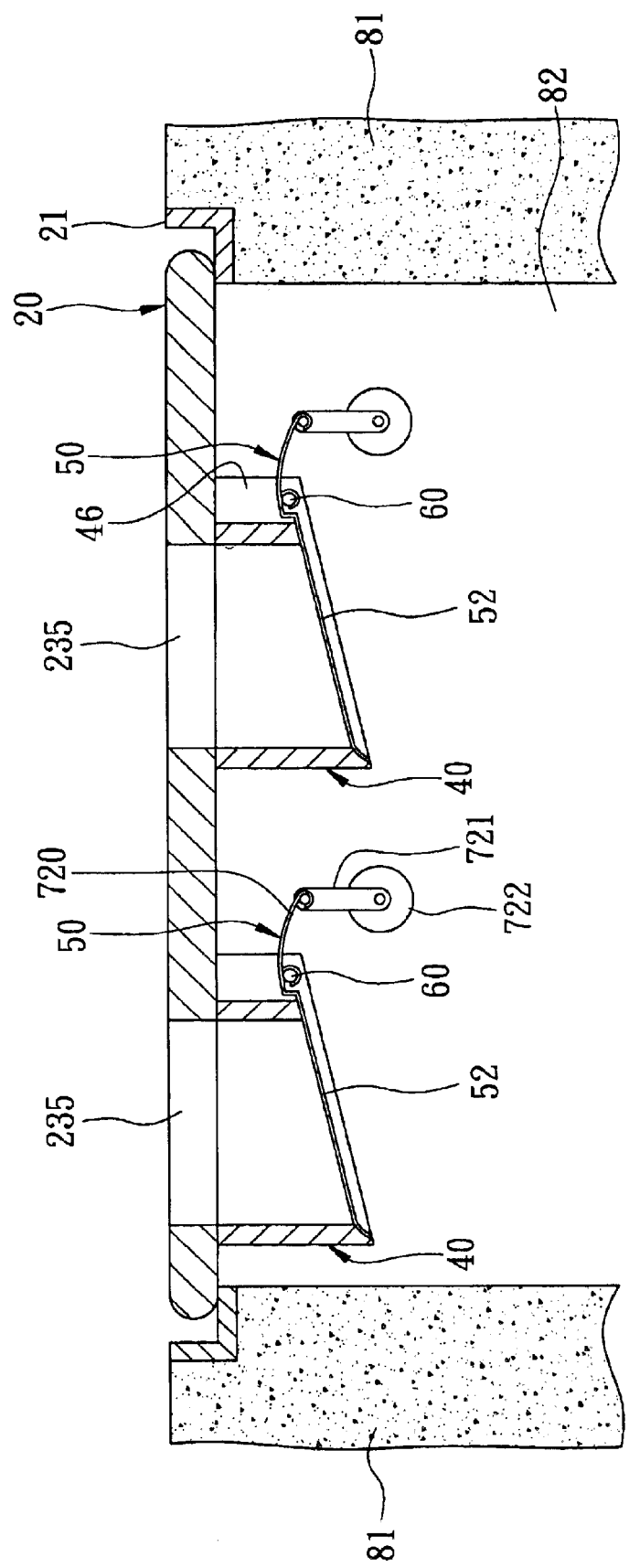
FIG. 15 is a sectional view of the sixth preferred embodiment of a drain cover assembly according to this invention.

FIG. 15 illustrates the sixth preferred embodiment of a drain cover assembly according to this invention. Unlike the embodiment of FIG. 14, the weighted portion of the pivot arm 50 includes the extension section 720, the link 721 and the weight-increasing member 722 of the embodiment of FIG. 10.

Figure 16:
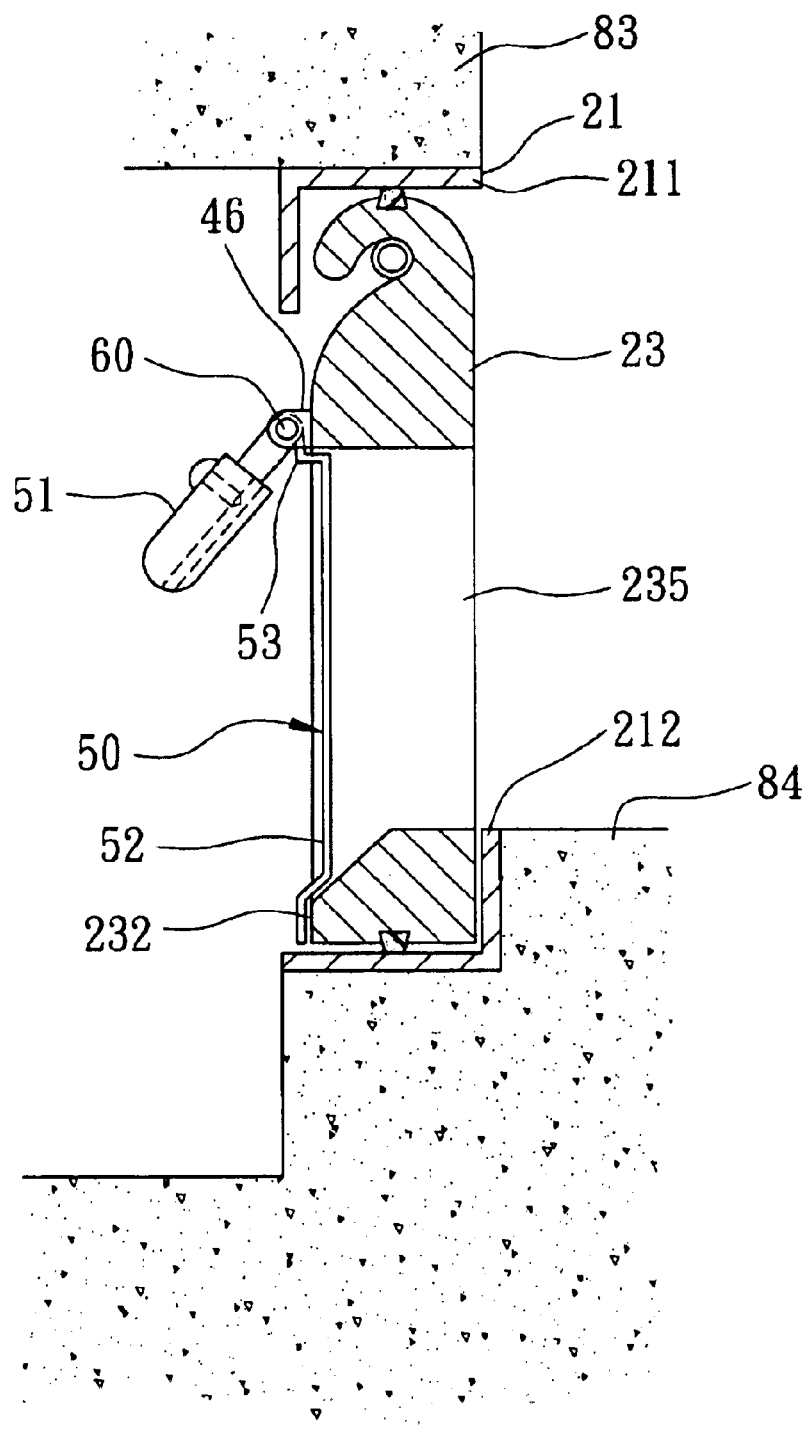
FIG. 16 is a sectional view of the seventh preferred embodiment of a drain cover assembly according to this invention.

Referring to FIG. 16, the seventh preferred embodiment of a drain cover assembly according to the present invention is shown to be mounted vertically in an upright wall 83 adjacent to a ground surface 84. The drain cover assembly comprises a drain cover unit that includes a cover plate 23 extending between first and second angled plates 211, 212 of a hollow seat frame 21 and retained in the latter. The cover plate 23 is formed with a drain hole 235, and has a rear side 232 formed with a pair of pivot lugs 46 (only one is shown) adjacent to a top edge of the drain hole 235. A closure device includes a pivot arm 50 having a mounting portion 53 connected pivotally to the cover plate 23 by a pivot axle 60 that extends through the pivot lugs 46. The pivot arm 50 of this embodiment further includes a flow control portion 52 that extends downwardly from the mounting portion 53 and that is used to close and open the drain hole 235, and a weighted portion 51 that extends downwardly and inclinedly from the mounting portion 53, that is disposed rearwardly of the flow control portion 52, and that has a variable length.

Figure 17:
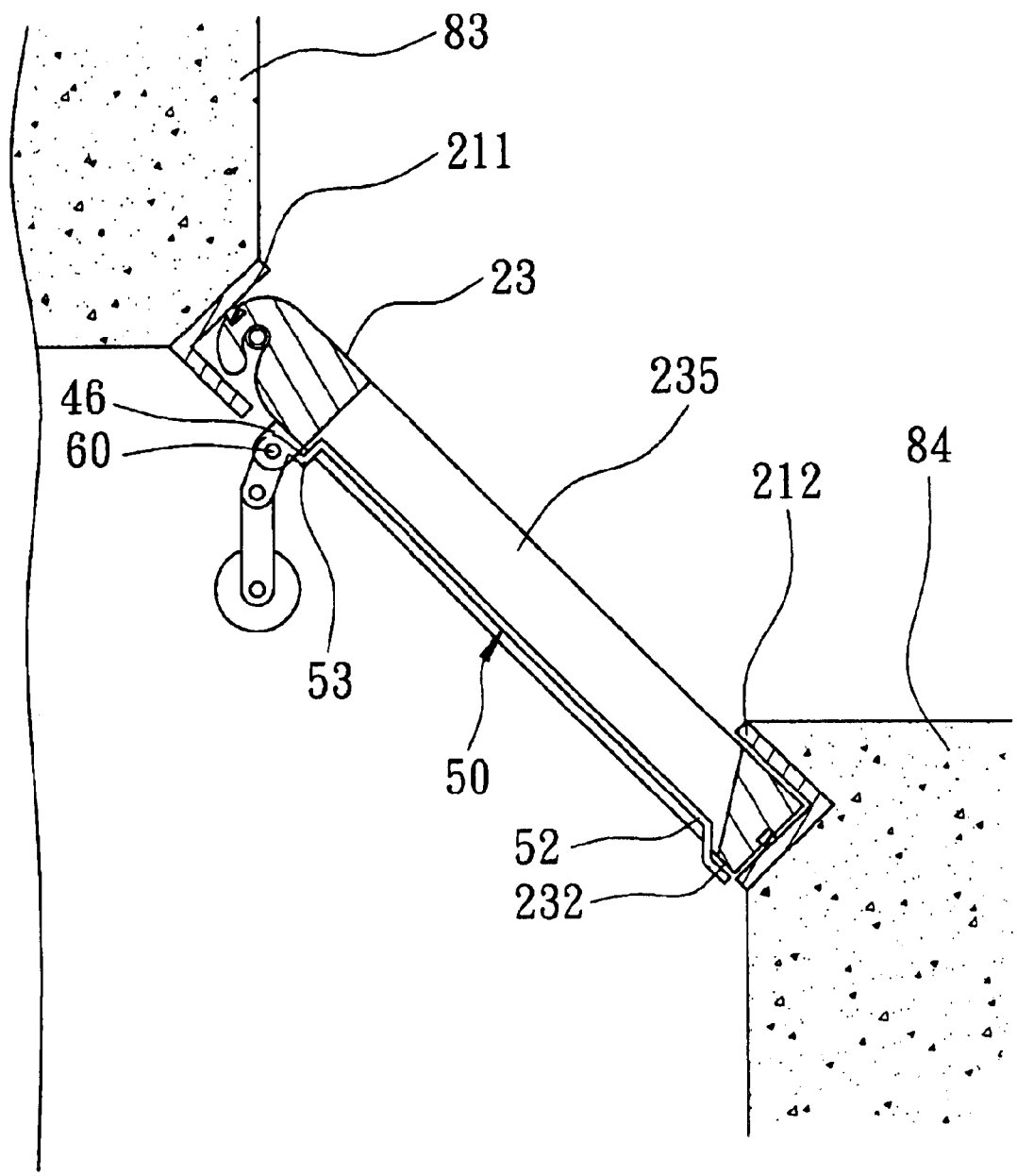
FIG. 17 is a sectional view of the eighth preferred embodiment of a drain cover assembly according to this invention.

FIG. 17 illustrates the eighth preferred embodiment of a drain cover assembly according to the present invention, which is a modification of the seventh preferred embodiment. Unlike the embodiment of FIG. 16, the drain cover assembly of this embodiment is disposed in an inclined state, and the construction of the weighted portion of the pivot arm 50 is based on that of the embodiment shown in FIGS. 10 and 11.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A drain cover assembly comprising:
   a drain cover unit including a cover plate formed with a drain hole; and
   a closure device operable so as to close and open said drain hole, said closure device including a pivot arm having a mounting portion connected pivotally to said cover plate, a flow control portion extending from and disposed on a first side of said mounting portion and registered with said drain hole, and a weighted portion extending from and disposed on a second side of said mounting portion opposite to said first side;
   said weighted portion having a weight sufficient to overcome weight of said flow control portion so as to cause said pivot arm to pivot from an open position to a normal closed position, where said flow control portion closes said drain hole;
   said pivot arm pivoting from the normal closed position to the open position when said flow control portion is subjected to an applied load through said drain hole that is sufficient to overcome the weight of said weighted portion;
   wherein said drain cover unit further includes a pivot seat mounted fixedly on said cover plate and having said mounting portion of said pivot arm mounted pivotally thereon; and
   wherein said pivot seat is a hollow seat that is registered with said drain hole and that has a first open end fixed to said cover plate, and a second open and opposite to said first open and, said second open end leaving a periphery said flow control portion having a peripheral section that engages said periphery of said second open end when said pivot arm is disposed at the normal closed position.

2. A drain cover assembly comprising:

a drain cover unit including a cover plate formed with a drain hole; and a closure device operable so as to close and open said drain hole, said closure device including a pivot arm having a mounting portion connected pivotally to said cover plate, a flow control portion extending from and disposed on a first side of said mounting portion and registered with said drain hole, and a weighted portion extending from and disposed on a second side of said mounting portion opposite to said first side;

said weighted portion having a weight sufficient to overcome weight of said flow control portion so at to cause said pivot arm to pivot from an open position to a normal closed position, where said flow control portion closes said drain hole;

said pivot arm pivoting from the normal closed position to the open position when said flow control portion is subjected to an applied load through said drain hole that is sufficient to overcome the weight of said weighted portion; and wherein said weighted portion applies an adjustable moment of force with respect to a pivot junction of said mounting portion and said cover plate.

3. A drain cover assembly comprising:

a drain cover unit including a cover plate formed with a drain hole; and a closure device operable so as to close and open said drain hole said closure device including a pivot arm having a mounting portion connected pivotally to said cover plate, a flow control portion extending from and disposed on a first side of said mounting portion and registered with said drain hole, and a weighted portion extending from and disposed on a second side of said mounting portion opposite to said first side;

said weighted portion having weight sufficient to overcome wait of said flow control portion so as to caused pivot arm to pivot from an open position to a normal closed position, where said flow control portion closes said drain hole;

said pivot arm pivoting from the normal closed position to the open position when said flow control portion is subjected to an applied load through said drain hole that is sufficient to overcome the weight of said weighted portion; and wherein said weighted portion has a weight-increasing block mounted thereto.

4. A drain cover assembly comprising:

a drain cover unit including a cover plate formed with a drain hole; and a closure device operable so as to close and open said drain hole, said closure device including a pivot arm having a mounting portion connected pivotally to said cover plate, a flow control portion extending from and disposed on a first side of said mounting portion an registered with said drain hole and a weighted portion extending from and disposed on a second side of said mounting portion opposite to said first side;

said weighted portion having a weight sufficient to overcome weight of said flow control portion so as to cause said pivot arm to pivot from an open position to a normal closed position, where said flow control portion closes said drain hole;

said pivot arm pivoting from the nominal closed position to the open position when said flow control portion is subjected to an applied load through said drain hole that is sufficient to overcome the weight of said weighted portion; and wherein said weighted portion includes:

an extension section extending from said mounting portion;

a link having opposite first and second ends, said first end of said link being pivoted to said extension section; and a weight-increasing member mounted on said second end of said link.

5. The drain cover assembly as claimed in claim 4, wherein said extension section has a variable length to permit adjusting of distance between said weight-increasing member and said mounting portion.

6. A drain cover assembly comprising:

a drain cover unit including a cover plate formed with a drain hole; and a closure device operable so as to close and open said drain hole, said closure device including a pivot arm having a mounting portion connected pivotally to said cover plate, a flow control portion extending from and disposed on a first side of said mounting portion and registered with said in hole, and a weighted portion extending from and disposed on a second side of said mounting portion opposite to said first side;

said weighted portion having a weight sufficient to overcome weight of said flow control portion so as to cause said pivot arm to pivot firm an open position to a normal closed position, where said flow control portion closes said drain hole;

said pivot arm pivoting from the normal closed position to the open position when said flow control portion is subjected to an applied load through said drain hole that is sufficient to overcome the weight of said weighted portion; and wherein said drain cover unit further includes a hollow seat frame for receiving said cover plate therein, and a pivot pin unit for retaining pivotally said cover plate in said seat frame.

\* \* \* \* \*